United States Patent
Chui et al.

(10) Patent No.: US 9,343,957 B1
(45) Date of Patent: May 17, 2016

(54) MULTI-CONVERTER SYSTEM INCLUDING A POWER DISTRIBUTION BALANCING CIRCUIT AND OPERATING METHOD THEREOF

(71) Applicant: Marvell International Ltd., Hamilton (BM)

(72) Inventors: Siew Yong Chui, Singapore (SG); Jun Li, Singapore (SG)

(73) Assignee: MARVELL INTERNATIONAL LTD., Hamilton (BM)

(*) Notice: Subject to any disclaimer, the term of this patent is extended or adjusted under 35 U.S.C. 154(b) by 301 days.

(21) Appl. No.: 14/159,392

(22) Filed: Jan. 20, 2014

Related U.S. Application Data

(60) Provisional application No. 61/757,833, filed on Jan. 29, 2013.

(51) Int. Cl.
  *H02M 3/06* (2006.01)

(52) U.S. Cl.
  CPC ................................ *H02M 3/06* (2013.01)

(58) Field of Classification Search
  None
  See application file for complete search history.

(56) References Cited

U.S. PATENT DOCUMENTS

| | | | | |
|---|---|---|---|---|
| 4,766,364 A * | 8/1988 | Biamonte | ................. | G05F 1/59 307/58 |
| 6,346,798 B1 * | 2/2002 | Passoni | ............... | H02M 3/1584 323/272 |
| 6,912,144 B1 * | 6/2005 | Clavette | .............. | H02M 3/1584 323/283 |
| 7,282,897 B2 * | 10/2007 | Moussaoui | ......... | H02M 3/1584 323/272 |
| 7,301,317 B1 * | 11/2007 | Mattingly | ........... | H02M 3/1584 323/282 |
| 2002/0125869 A1 * | 9/2002 | Groom | ................ | H02M 3/1584 323/283 |
| 2004/0239301 A1 * | 12/2004 | Kobayashi | .......... | H02M 3/1588 323/284 |
| 2005/0010825 A1 * | 1/2005 | Pullen | ................. | H02M 3/1584 713/300 |
| 2006/0077604 A1 * | 4/2006 | Jansen | ..................... | H02J 1/102 361/90 |
| 2006/0203524 A1 * | 9/2006 | Ohno | ..................... | H02J 1/102 363/95 |
| 2007/0064456 A1 * | 3/2007 | Schuellein | .......... | H02M 3/1584 363/65 |
| 2007/0262758 A1 * | 11/2007 | Wildash | .............. | H02M 1/4216 323/272 |
| 2008/0316783 A1 * | 12/2008 | O'Loughlin | ........ | H02M 1/4225 363/124 |
| 2009/0237133 A1 * | 9/2009 | Yang | ................... | H02M 3/1584 327/161 |
| 2009/0289502 A1 * | 11/2009 | Batarseh | ................. | H02J 1/102 307/44 |
| 2010/0141230 A1 * | 6/2010 | Lukic | .................. | H02M 3/1584 323/283 |
| 2012/0256659 A1 * | 10/2012 | Kiadeh | ............... | H02M 3/1584 327/108 |
| 2012/0268026 A1 * | 10/2012 | Crawford | ........... | H05B 33/0815 315/210 |
| 2013/0038231 A1 * | 2/2013 | Zhang | .................. | H05B 41/288 315/224 |
| 2013/0169262 A1 * | 7/2013 | Hartman | ............. | H02M 3/1584 323/351 |
| 2014/0002038 A1 * | 1/2014 | Hsu | ...................... | H02M 3/1584 323/271 |
| 2014/0097818 A1 * | 4/2014 | Wiktor | .................. | H02M 3/156 323/283 |
| 2014/0375288 A1 * | 12/2014 | Nora | ................... | H02M 3/1584 323/272 |

* cited by examiner

*Primary Examiner* — Timothy J Dole
*Assistant Examiner* — Yusef Ahmed

(57) ABSTRACT

A multi-converter system includes a first converter configured to receive an input voltage and output a first PWM switching signal based on the input voltage. A power distribution balancing circuit is configured to detect a frequency of the first PWM switching signal and generate a control signal based on the frequency of the first PWM switching signal. A second converter is configured to receive the input voltage and output a second PWM switching signal in response to the control signal. An output voltage node is configured to output an output voltage based on the first and second PWM switching signals.

20 Claims, 12 Drawing Sheets

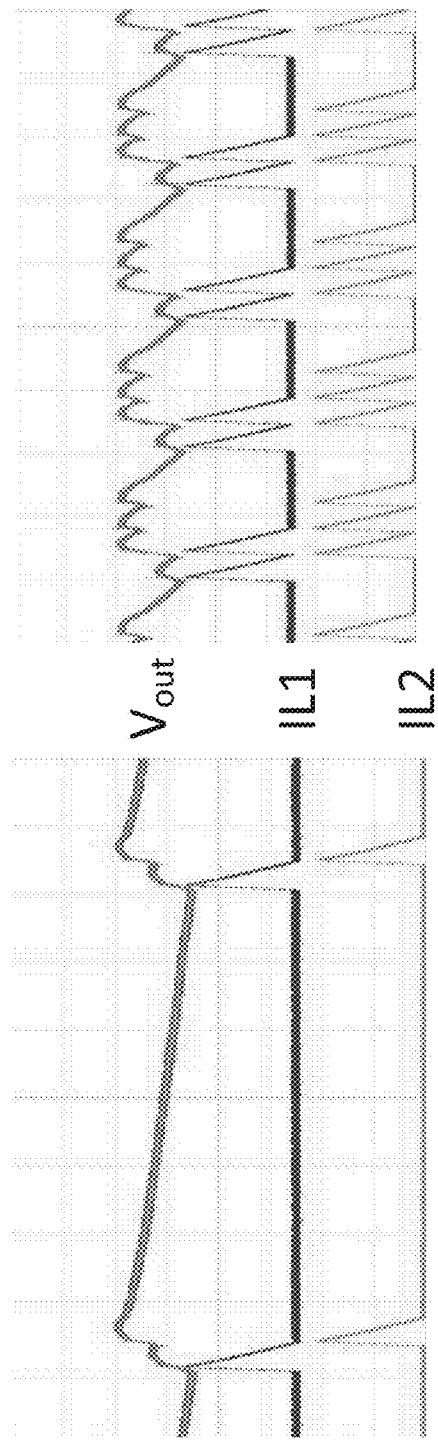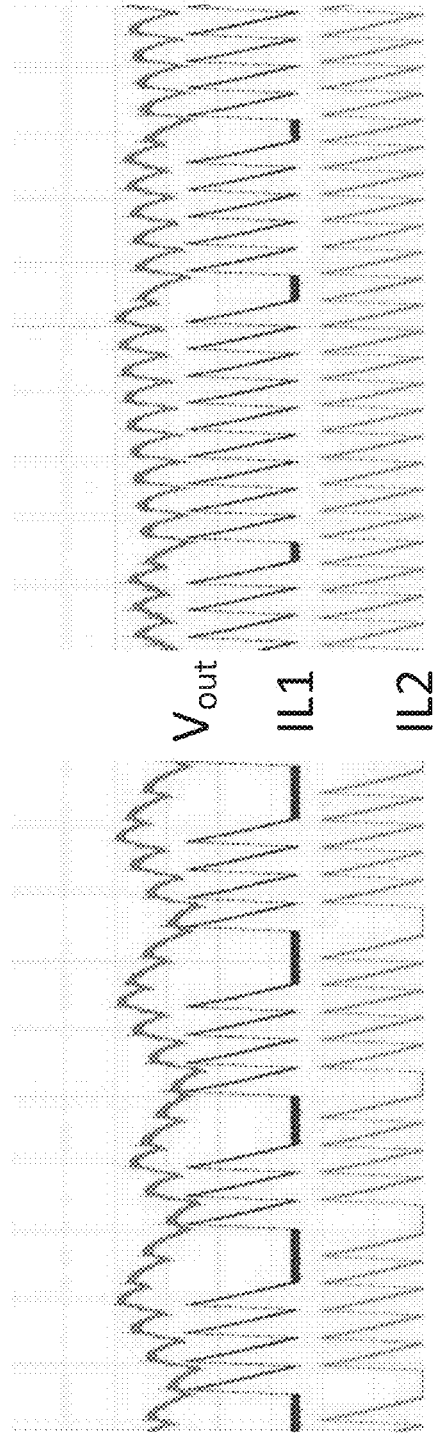
Fig. 3A  Fig. 3B  Fig. 3C  Fig. 3D

MULTI-CONVERTER SYSTEM INCLUDING A POWER DISTRIBUTION BALANCING CIRCUIT AND OPERATING METHOD THEREOF

CROSS-REFERENCE TO RELATED APPLICATION

This present disclosure claims the benefit of U.S. Provisional Application No. 61/757,833, filed on Jan. 29, 2013, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Voltage regulators or voltage converters are electrical devices that transform a voltage at a first level into a voltage at a second level. The voltage regulators may be used as a power source to convert a voltage at a high level to a voltage at a lower level. For example, these converters act as a power supply controller to operate circuits in a smart lighting including LED drivers, sensors, switches, or many other applications.

BRIEF SUMMARY

Embodiments are directed to a multi-converter system and an operating method thereof, which are capable of providing balanced power distribution among individual converters in the multi-converter system to maintain high power efficiency.

In an embodiment, a multi-converter system includes a first converter configured to receive an input voltage and output a first pulse width modulation (PWM) switching signal based on the input voltage, a power distribution balancing circuit configured to detect a frequency of the first PWM switching signal and generate a control signal based on the frequency of the first PWM switching signal, a second converter configured to receive the input voltage and output a second PWM switching signal in response to the control signal, and an output voltage node configured to output an output voltage based on the first and second PWM switching signals.

In an embodiment, the second converter is controlled to output the second PWM switching signal having a frequency corresponding to that of the first PWM switching signal to balance power distribution between the first converter and the second converter.

In an embodiment, the control signal is used to determine a DC operating point of a voltage input to a feedback node of the second converter.

In an embodiment, the multi-converter system further includes a feedback module configured to generate a feedback voltage based on the output voltage and provide the feedback voltage to a feedback node of the first converter.

In an embodiment, the multi-converter system further includes a second feedback module configured to generate a feedback voltage based on the output voltage and provide the feedback voltage of the second feedback module to a feedback node of the second converter.

In an embodiment, the second converter receives through the feedback node a voltage determined based on the control signal and the feedback voltage output from the second feedback module.

In an embodiment, the multi-converter system further includes a second power distribution balancing circuit configured to detect a frequency of the second current signal and output a second control signal based on the frequency of the second PWM switching signal, and a third converter configured to receive the input voltage and output a third PWM switching signal in response to the second control signal. The output voltage is provided based on the first, second, and third PWM switching signals.

In an embodiment, the multi-converter system further includes a third converter configured to receive the input voltage and output a third PWM switching signal in response to the control signal. The output voltage of the multi-converter system is determined based on the first, second, and third PWM switching signals.

In an embodiment, a method includes providing a first PWM switching signal based on an input voltage by a first converter. A control signal is generated based on a frequency of the first PWM switching signal. A second PWM switching signal is provided based on the input voltage and the control signal by a second converter. An output voltage is output based on the first and second PWM switching signals.

In an embodiment, the method further includes generating a second control signal based on the frequency of the second PWM switching signal. A third PWM switching signal is provided based on the input voltage and the second control signal by a third converter. The output voltage is determined based on the first, second, and third PWM switching signals.

In an embodiment, the method further includes providing a third PWM switching signal based on the input voltage and the control signal by a third converter. The output voltage is determined based on the first, second, and third PWM switching signals.

In an embodiment, the second PWM switching signal has a frequency corresponding to that of the first PWM switching signal to balance power distribution between the first converter and the second converter.

In an embodiment, the control signal is used to determine a DC operating point of a voltage input to a feedback node of the second converter.

BRIEF DESCRIPTION OF THE DRAWINGS

Various embodiments of this disclosure that are proposed as examples will be described in detail with reference to the following figures, wherein like numerals reference like elements, and wherein:

FIGS. 3A to 3D are waveform diagrams illustrating operational results of the multi-converter system of FIG. 2 according to load variation.

DETAILED DESCRIPTION

The details of one or more implementations are set forth in the accompanying drawings and the description below. Other features, aspects, and advantages may become apparent from the description, the drawings, and the claims.

Figure 1A:
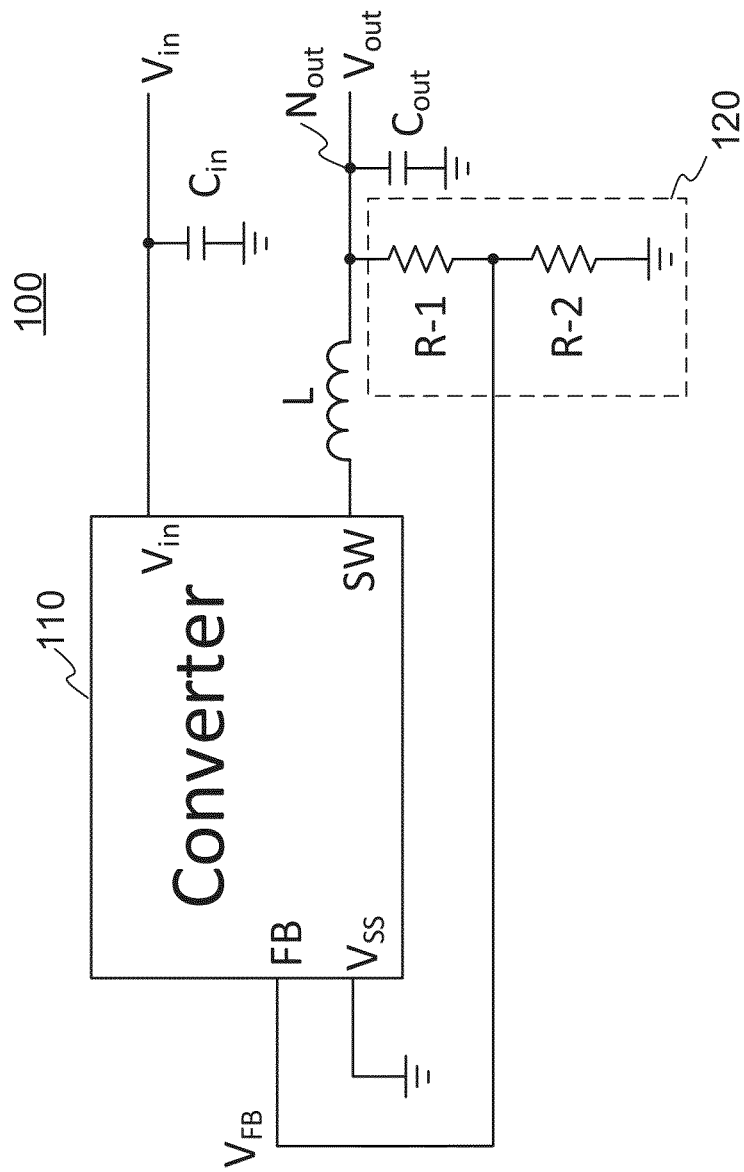
FIG. 1A illustrates a voltage converter system having a closed-loop control scheme.

FIG. 1A illustrates a voltage converter system 100 having a closed-loop control scheme. The voltage converter system 100 converts an input voltage Vin into an output voltage Vout under the control of a feedback voltage $V_{FB}$.

In FIG. 1A, the voltage converter system 100 includes a voltage converter 110, an inductor L, an input capacitor Cin, and an output capacitor Cout. The voltage converter 110 includes an input pin Vin receiving the input voltage Vin, a feedback (FB) pin receiving the feedback voltage $V_{FB}$, and a switch (SW) pin generating a voltage difference between the SW pin and the output voltage Vout for charging and discharging the inductor L. The input capacitor Cin is coupled to and disposed between an input voltage node, i.e., the input pin Vin, and a ground terminal. The output capacitor Cout is coupled to and disposed between an output voltage node Nout and the ground terminal. The output voltage Vout is generated based on the accumulation of the charging and discharging current flowing through the inductor L and the capacitor Cout.

The voltage converter system 100 further includes a feedback module, e.g., a voltage divider 120, which generates the feedback voltage $V_{FB}$ based on the output voltage Vout. The voltage divider 120 is coupled to and disposed between the output voltage node Nout and the FB pin of the voltage converter 110.

The voltage divider 120 includes resistors R-1 and R-2 serially connected to each other. The resistor R-1 is coupled to and disposed between the output voltage node Nout and the FB pin, and the resistor R-2 is coupled to and disposed between the FB pin and the ground terminal. The voltage divider 120 outputs the feedback voltage $V_{FB}$ by dividing a voltage level of the output voltage Vout.

Figure 1B:
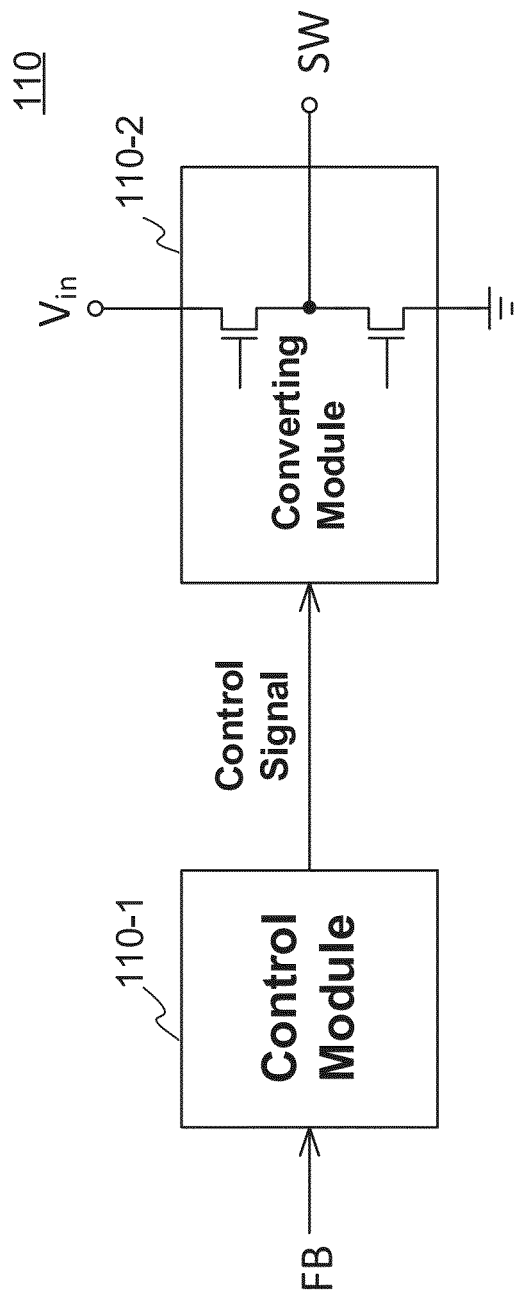
FIG. 1B illustrates a voltage converter included in the voltage converter system shown in FIG. 1A.

FIG. 1B illustrates an example of the voltage converter 110. The voltage converter 110 includes a control module 110-1 and a converting module 110-2.

Referring to FIGS. 1A and 1B, the control module 110-1 receives the feedback voltage $V_{FB}$ through the FB pin and generates a control signal based on the feedback voltage $V_{FB}$. Accordingly, the FB pin may also be referred to as a control pin. The converting module 110-2 is configured to receive the control signal from the control module 110-1 and charge/discharge the inductor L in response to the control signal.

The converting module 110-2 may convert the input voltage Vin into the output voltage Vout based on a frequency and duty cycle of the control signal. The output voltage Vout has a voltage level different than that of the input voltage Vin.

The control module 110-1 may initiate the control signal when a large voltage or transient current is detected in the output voltage Vout. For example, the control module 110-1 initiates the control signal when a voltage level of the output voltage Vout is outside of a predetermined range.

In an embodiment, the control module 110-1 initiates the control signal based on the feedback voltage $V_{FB}$. For example, the control module 110-1 sets a signal waveform of the control signal low (or high) when the feedback voltage $V_{FB}$ is greater than a first reference voltage. This allows the inductor L to be discharged to pull down the voltage level of the output voltage Vout.

On the other hand, the control module 110-1 may set the signal waveform of the control signal high (or low) when the feedback voltage $V_{FB}$ is less than a second reference voltage. This allows the inductor L to be charged to pull up the voltage level of the output voltage Vout.

When the voltage level of the output voltage Vout is adjusted such that the voltage level becomes within the predetermined range, the control module 110-1 may revert back to a complementary operation of the control signal.

Figure 1C:
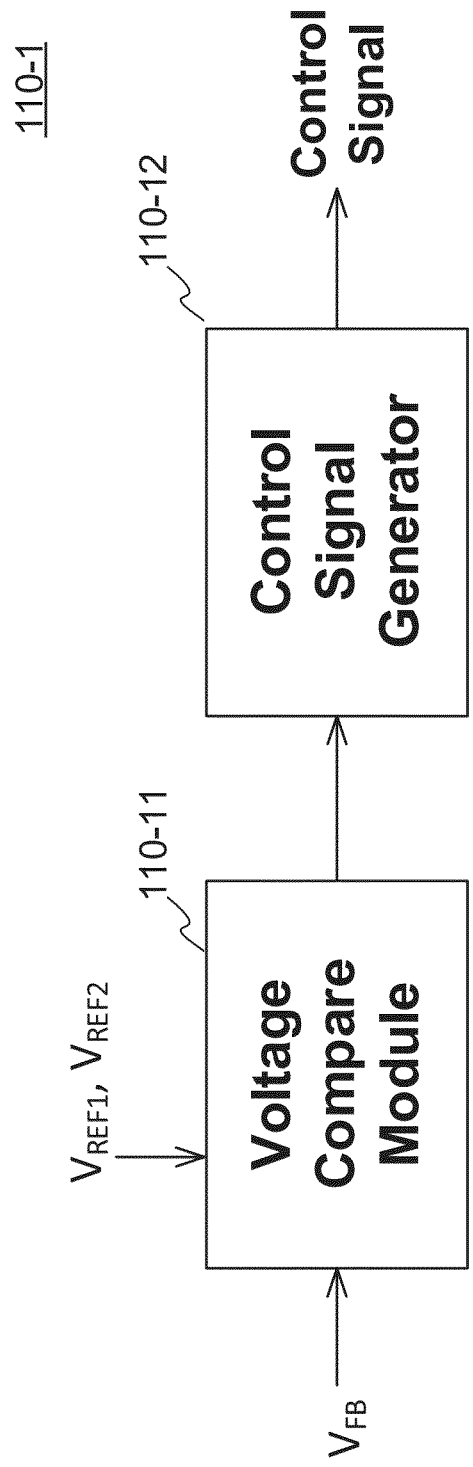
FIG. 1C illustrates a control module included in the voltage converter shown in FIG. 1B.

Referring to FIG. 1C, the control module 110-1 includes a voltage compare module 110-11 and a control signal generator 110-12. The voltage compare module 110-11 compares the feedback voltage $V_{FB}$ with a reference voltage, e.g., a first or second reference voltage $V_{RFE1}$ or $V_{REF2}$, to determine whether the feedback voltage $V_{FB}$ is greater than the first reference voltage $V_{RFE1}$ or less than the second reference voltage $V_{REF2}$. The control signal generator 110-12 generates the control signal based on the comparison results output from the voltage compare module 110-11.

Figure 2:
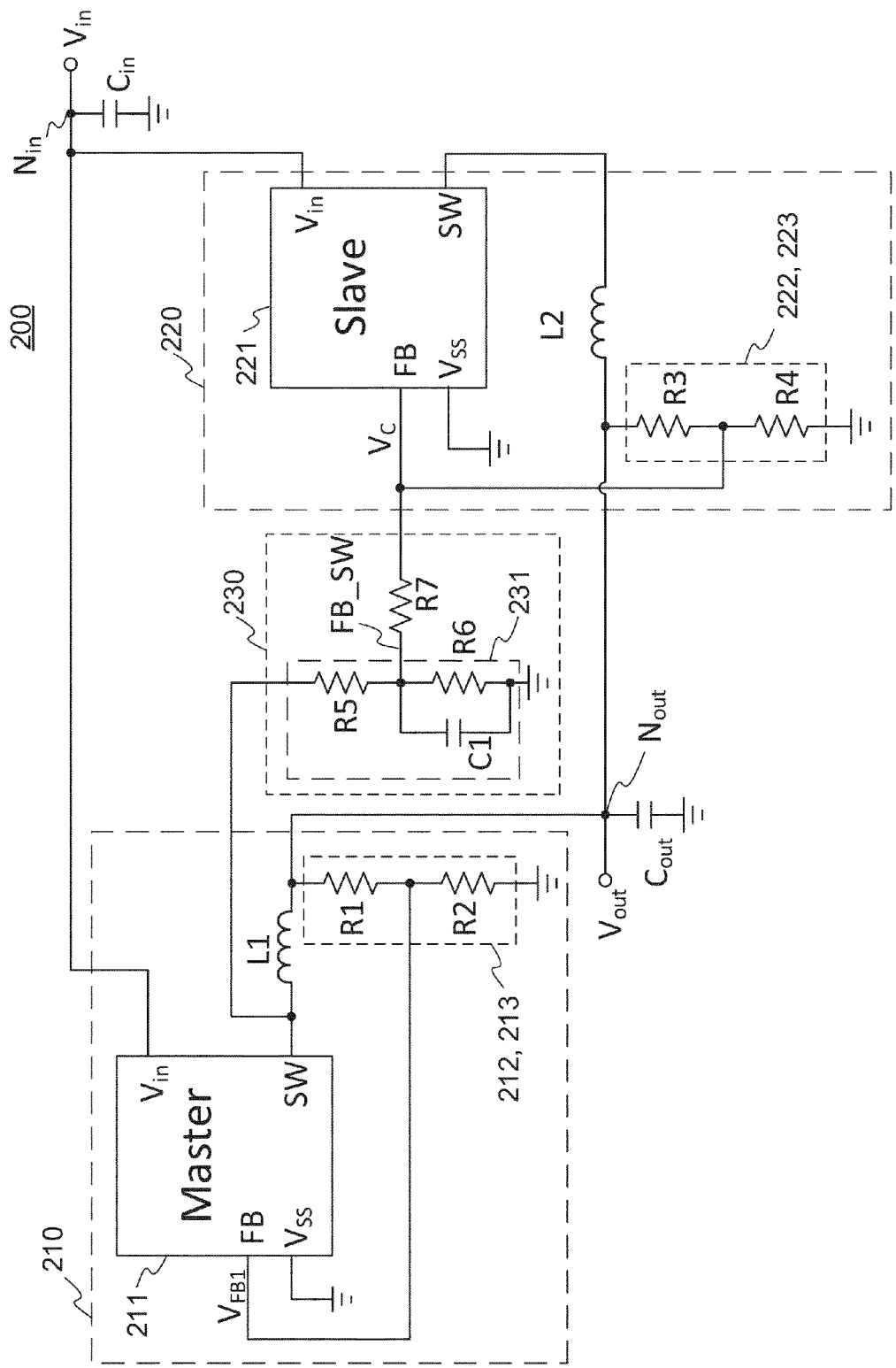
FIG. 2 illustrates a multi-converter system according to an embodiment.

FIG. 2 illustrates a multi-converter system 200 according to an embodiment of the present disclosure. The multi-converter system 200 includes a first converter stage 210, a second converter stage 220, and a power distribution balancing circuit 230. The multi-converter system 200 maintains high power efficiency by using the power distribution balancing circuit 230 to provide balanced power distribution to the first and second converter stages 210 and 220.

The first and second converter stages 210 and 220 are coupled in parallel to each other and disposed between an input voltage node Nin and an output voltage node Nout. The power distribution balancing circuit 230 is coupled to and disposed between the first converter stage 210 and the second converter stage 220.

In an embodiment, the first and second converter stages 210 and 220 are implemented using the voltage converter system 100 illustrated in FIG. 1A, but they are not limited thereto. The first or second converter stage 210 or 220 may include any voltage converter system having a closed-loop control scheme.

In FIG. 2, the first converter stage 210 includes a first converter 211 that acts as a master converter, an inductor L1 that is coupled to and disposed between an SW pin of the first converter 211 and the output voltage node Nout, and a feedback module 212 that is coupled to and disposed between the output voltage node Nout and a FB pin of the first converter 211.

The feedback module 212 includes a voltage divider 213 for dividing a voltage level of an output voltage Vout. The voltage divider 213 includes resistors R1 and R2 serially connected to each other between the output voltage node Nout and a ground terminal, and provides a divided voltage to the FB pin of the master converter 211 as a feedback voltage $V_{FB1}$.

The feedback voltage $V_{FB1}$ is used to control a voltage converting operation of the master converter 211. Thus, the master converter 211 outputs a pulse width modulation (PWM) switching signal through the SW pin to cause the output voltage Vout to have a voltage level in a desirable range.

In an embodiment, the second converter stage 220 has substantially the same configuration as that of the first converter stage 210. The second converter stage 220 includes a second converter 221 that acts as a slave converter, an inductor L2 that is coupled to and disposed between a SW pin of the second converter 221 and the output voltage node Nout, and a feedback module 222 that is coupled to and disposed between the output voltage node Nout and a FB pin of the second converter 221.

In an embodiment, the inductor L2 has substantially the same inductance as that of the inductor L1 of the first converter stage 210. In another embodiment, the inductor L2 has a different inductance from that of the inductor L1.

The feedback module 222 includes a voltage divider 223 for dividing the voltage level of the output voltage Vout. The voltage divider 223 includes resistors R3 and R4 serially connected to each other between the output voltage node Nout and the ground terminal, and provides a divided voltage to the FB pin of the slave converter 221 as a feedback voltage.

The slave converter 221 receives a control voltage Vc through the FB pin. The control voltage Vc is determined by a superposition of a first voltage, i.e., the divided voltage output from the voltage divider 223, and a second voltage output from the power distribution balancing circuit 230.

The control voltage Vc is used to control a voltage converting operation of the slave converter 221 and thus may be referred to as a control signal for the slave converter 221. The slave converter 221 outputs a PWM switching signal through the SW pin based on the control voltage Vc received. The PWM switching signal of the slave converter 221 is used to cause the output voltage Vout to have a voltage level in the desirable range.

The power distribution balancing circuit 230 detects a frequency of the PWM switching signal of the master converter 211 that is provided through the SW pin of the master converter 211, and outputs the second voltage whose voltage level changes according to the detected frequency.

The power distribution balancing circuit 230 includes a low pass filter 231 and a bridging resistor R7. The low pass filter 231 includes resistors R5 and R6 and a capacitor C1. The resistors R5 and R6 are coupled to and disposed between the SW pin of the master converter 211 and the ground terminal. The capacitor C1 is coupled in parallel with the resistor R6. The bridging resistor R7 is coupled to and disposed between an output node FB_SW of the low pass filter 231 and the FB pin of the slave converter 221. All of the resistors R5, R6, and R7 and the capacitor C1 of the power distribution balancing circuit 230 are connected to each other through the output node FB_SW.

Since the low pass filter 231 acts as a frequency variable potential divider, the low pass filter detects the frequency of the PWM switching signal of the master converter 211 that is output through the SW pin of the master converter 211, and outputs the second voltage to the FB pin of the slave converter 221 through the bridging resistor R7.

If the frequency of the PWM switching signal of the master converter 211 is relatively low and thus the capacitive reactance of the capacitor C1 becomes higher than the resistance of the resistor R6, more current flows through the resistor R6 than the capacitor C1. As a result, a voltage level at the output node FB_SW is determined approximately by a resistance ratio of the resistors R5 and R6.

On the other hand, if the frequency of the PWM switching signal of the master converter 211 is relatively high and thus the capacitive reactance of the capacitor C1 becomes lower than the resistance of the resistor R6, more current flows through the capacitor C1 than the resistor R6. As a result, the voltage level at the output node FB_SW is determined approximately by a ratio of the resistance of the resistor R5 and the capacitive reactance of the capacitor C1. As the frequency of the PWM switching signal of the master converter 211 increases, much more current flows through the capacitor C1, and thus the capacitive reactance of the capacitor C1 decreases.

Accordingly, as described above, as the frequency of the PWM switching signal of the master converter 211 increases, the voltage level at the output node FB_SW, which depends on the ratio of the resistance of the resistor R5 and the capacitive reactance of the capacitor C1, decreases. The voltage level at the output node FB_SW is provided to the FB pin of the slave converter 221 through the bridging resistor R7 as the second voltage. Then, the second voltage is superposed with the first voltage output from the voltage divider 223. The superposed voltage is input to the FB pin of the slave converter 221 as the control voltage Vc to control the voltage converting operation of the slave converter 221.

Referring to FIG. 1B, the control voltage Vc input to the FB pin of the slave converter 221 is used to generate a control signal which in turn controls a voltage converting operation of a converting module in the slave converter 221.

In an embodiment, the slave converter 221 is implemented with a converter that has a characteristic of outputting a PWM switching signal having a higher frequency in response to a feedback voltage having a lower voltage level. Thus, as the frequency of the PWM switching signal of the master converter 211 becomes higher, the control voltage Vc has a lower voltage level and thus enables the slave converter 221 to output a PWM switching signal having a higher frequency.

As a result, the slave converter 221 outputs the PWM switching signal having a frequency that corresponds to the frequency of the PWM switching signal of the master converter 211. In an embodiment, the frequency of the PWM switching signal of the slave converter 221 is substantially the same as that of the master converter 211, as will be described later with reference to FIGS. 3A to 3D.

In an embodiment, a ratio of resistances of the resistors R5 and R6 correspond to that of the resistors R3 and R4, e.g., the ratios are substantially the same. In another embodiment, the resistance ratio of the resistors R5 and R6 and that of the resistors R3 and R4 are adjusted to modify a voltage converting operation of the slave converter 221.

A time constant of the voltage divider 223 and the power distribution balancing circuit 230 is determined by C1//R5//R6//(R7+R3//R4). The time constant may be determined by considering a normal switching frequency range of the master converter 211.

In an embodiment, the PWM switching signals output through the SW pins of the master converter 211 and the slave converter 221 are provided to the FB pin of the slave converter 221. Thus, the slave converter 221 operates in a mode of interpreting the PWM switching signals from the SW pins applied to its FB pin in a manner of balancing power distribution of the master converter 211 and the slave converter 221 to drive a load coupled to the output voltage node Nout with high power efficiency. Accordingly, such an operation may be referred to as a dual mode FB pin operation.

In an embodiment, since the multi-converter system 200 uses the slave converter 221 that outputs the PWM switching signal having a higher frequency if the control voltage Vc received has a lower voltage level, the power distribution balancing circuit 230 including the low pass filter and the bridging resistor R7 operates to gradually pull down a voltage level of the control voltage Vc as the frequency of the PWM switching signal of the master converter 211 increases.

However, in another embodiment, if the slave converter 221 is configured to output a PWM switching signal having a higher frequency if a control voltage Vc received has a higher voltage level, the power distribution balancing circuit 230 may be configured to gradually pull up a voltage level of the control voltage Vc as a frequency of a PWM switching signal of the master converter 211 increases.

FIGS. 3A to 3D are waveform diagrams illustrating operational results of the multi-converter system 200 of FIG. 2 according to load variation. FIGS. 3A to 3D show the performance of the multi-converter system 200 on different load conditions when a fixed VDD is supplied. The load increases from FIG. 3A to FIG. 3D.

As a load becomes heavier, the multi-converter system 200 acting as a power source of the load should supply larger power to the load. Thus, the multi-converter system 200 operates with a higher power frequency.

In the multi-converter system 200, since the power distribution balancing circuit 230 is coupled to and disposed between the master converter 211 and the slave converter 221, the power distribution balancing circuit 230 detects the frequency of the PWM switching signal, e.g., current IL1, of the master converter 211, and outputs the second voltage to the FB pin of the slave converter 221.

Thereafter, the slave converter 221 performs its voltage converting operation according to the control voltage Vc that is determined based on the first voltage from the voltage divider 223 and the second voltage from the power distribution balancing circuit 230.

In an embodiment, since the slave converter 221 is coupled to the master converter 211 as described in FIG. 2, as the frequency of the PWM switching signal of the master converter 211 increases, the slave converter 221 generates the PWM switching signal, e.g., current IL2, having a frequency similar to the frequency of the PWM switching signal IL1 of the master converter 211 in response to the control voltage Vc, as shown in FIGS. 3A to 3D. The output voltage Vout from both the master converter 211 and the slave converter 221, may provide improved overall power efficiency.

In another embodiment, the behavior for FIG. 3A may be adjusted such that only the master converter 211 is in an active mode and the slave converter 221 is in a standby mode to reduce an output voltage ripple when the load is light. This may be achieved by changing the resistance ratio of the resistors R3 and R4 in FIG. 2 since the resistance ratio affects a DC operating point of the control voltage Vc input to the slave converter 221. For example, the resistance ratio of the resistors R3 and R4 is adjusted such that the DC operating point of the control voltage Vc is greater than a threshold value to keep the slave converter 221 in the standby mode. A person of skill in the art in light of the disclosure and teachings herein would understand that the DC operating point of the control voltage Vc may vary according to a different load application requirement.

Figure 4:
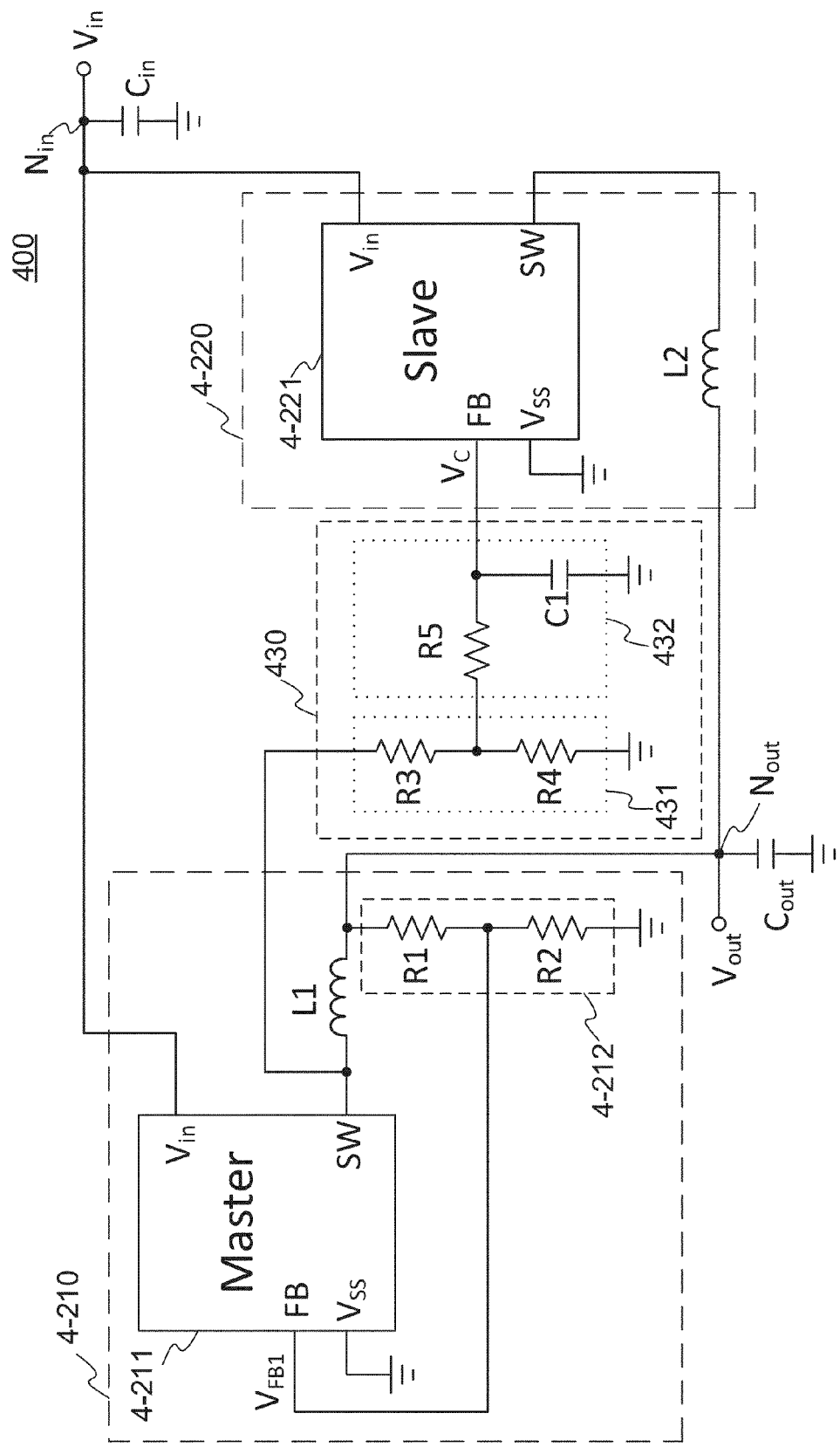
FIG. 4 illustrates a multi-converter system according to an embodiment.

FIG. 4 illustrates a multi-converter system 400 according to another embodiment of the present disclosure. The multi-converter system 400 includes a first converter stage 4-210, a second converter stage 4-220, and a power distribution balancing circuit 430. The multi-converter system 400 maintains high power efficiency by using the power distribution balancing circuit 430 to provide balanced power distribution to the first and second converter stages 4-210 and 4-220.

The first converter stage 4-210 includes a first converter 4-211 that acts as a master converter, an inductor L1 that is coupled to and disposed between an SW pin of the first converter 4-211 and an output voltage node Nout, and a feedback module 4-212 that is coupled to and disposed between the output voltage node Nout and a FB pin of the first converter 4-211. The configuration of the first converter stage 4-210 is substantially the same as that of the first converter stage 210 in FIG. 2. Accordingly, the description thereof will be omitted for illustrative convenience.

The second converter stage 4-220 includes a second converter 4-221 acting as a slave converter and an inductor L2 that is coupled to and disposed between an SW pin of the second converter 4-221 and the output voltage node Nout. Unlike the second converter stage 220 shown in FIG. 2, the second converter stage 4-220 does not include a feedback module that is coupled to and disposed between the output voltage node Nout and the FB pin of the second converter 4-221.

The power distribution balancing circuit 430 includes a voltage divider 431 and a low pass filter 432. The power distribution balancing circuit 430 senses a PWM switching signal of the master converter 4-211 using the voltage divider 431 and the low pass filter 432. Thus, the FB pin of the second converter 4-221 receives a control voltage Vc determined by sensing the PWM switching signal of the master converter 4-211.

The voltage divider 431 includes resistors R3 and R4 coupled in series to each other and disposed between the SW pin of the master converter 4-211 and a ground terminal. The low pass filter 432 includes a resistor R5 and a capacitor C1. The resistor R5 is coupled to and disposed between an output node of the voltage divider 431 and the FB pin of the slave converter 4-221, and the capacitor C1 is coupled to and disposed between the FB pin of the slave converter 4-221 and the ground terminal.

The power distribution balancing circuit 430 determines a DC operating point of the control voltage Vc input to the FB pin of the slave converter 4-221 for a comparison with an internal reference voltage. A time constant (C1//R5(R3//R4)) of the power distribution balancing circuit 430 is determined by considering a normal switching frequency range of the master converter 4-211. In an embodiment, the slave converter 4-221 may be deactivated to increase power efficiency on a light load condition.

As described above, the multi-converter system 400 shown in FIG. 4 includes a smaller number of components than the multi-converter system 200 shown in FIG. 2 since the second converter stage 4-220 does not include a feedback module. Therefore, the multi-converter system 400 may be implemented with less bill of materials (BOM) than the multi-converter system 200 since less components are used for the former.

Figure 5:
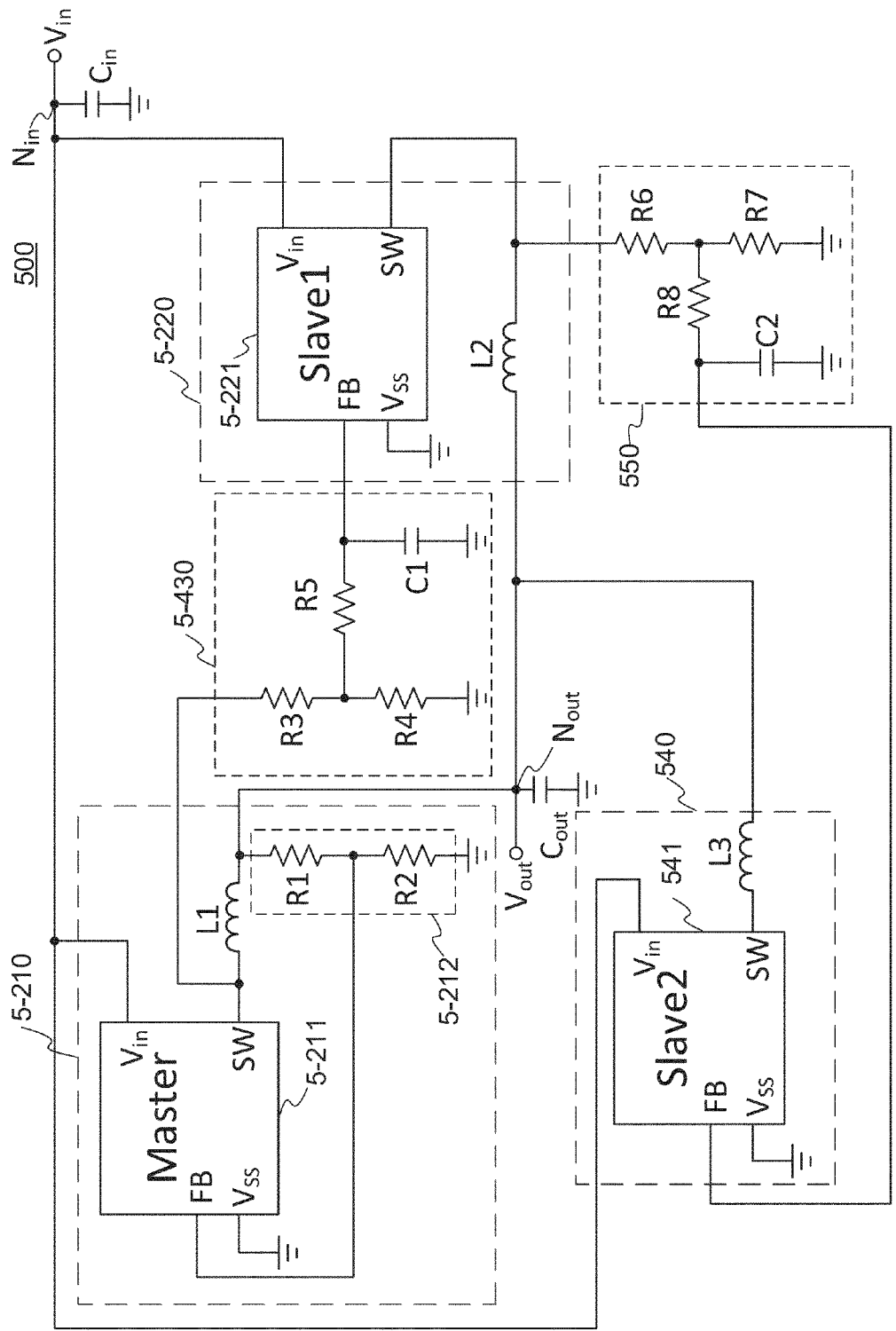
FIG. 5 illustrates a multi-converter system according to an embodiment.

FIG. 5 illustrates a multi-converter system 500 according to another embodiment of the present disclosure. The multi-converter system 500 works as a triple converter system using sequential triggering. The multi-converter system 500 provides improved power efficiency and reduces a ripple of the output voltage Vout when the load increases.

The multi-converter system 500 includes first to third converter stages 5-210, 5-220, and 540, and first and second power distribution balancing circuits 5-430 and 550. The first to third converter stages 5-210, 5-220, and 540 are coupled to and disposed between an input voltage node Nin and an output voltage node Nout. The first power distribution balancing circuit 5-430 is coupled to and disposed between the first converter stage 5-210 and the second converter stage 5-220. The second power distribution balancing circuit 550 is coupled to and disposed between the second converter stage 5-220 and the third converter stage 540.

The first converter stage 5-210 has substantially the same configuration as that of the first converter stage 210 shown in FIG. 2. That is, the first converter stage 5-210 includes a master converter 5-211, a feedback module 5-212, and an inductor L1.

Each of the second and third converter stages 5-220 and 540 has substantially the same configuration as that of the second converter stage 4-220 shown in FIG. 4. That is, the second converter stage 5-220 includes a first slave converter 5-221 and an inductor L2. The third converter stage 540 includes a second slave converter 541 and an inductor L3.

The first power distribution balancing circuit 5-430 is coupled to and disposed between a SW pin of the master converter 5-211 and a FB pin of the first slave converter 5-221. The second power distribution balancing circuit 550 is coupled to and disposed between a SW pin of the first slave converter 5-221 and a FB pin of the second slave converter 541.

The first power distribution balancing circuit 5-430 detects a frequency of a PWM switching signal of the master converter 5-211 and enables the first slave converter 5-221 for operation. The second power distribution balancing circuit 550 detects a frequency of a PWM switching signal of the first slave converter 5-221 and enables the second slave converter 541 for operation.

In other words, the master converter 5-211 enables the first slave converter 5-221 to work first, and then the first slave converter 5-221 enables the second slave converter 541 to work. For example, the master converter 5-211, the first slave converter 5-221, and the second slave converter 541 may be sequentially activated to convert the input voltage Vin into the output voltage Vout according to load variation of an application to be driven by the multi-converter system 500.

Each of the first and second power distribution balancing circuits 5-430 and 550 has substantially the same configuration as that of the power distribution balancing circuit 430 shown in FIG. 4, but they are not limited thereto.

In an embodiment, the first power distribution balancing circuit 5-430 includes a voltage divider and a low pass filter, which are coupled to each other. The voltage divider includes resistors R3 and R4 serially connected to each other between the SW pin of the master converter 5-211 and a ground terminal. The low pass filter includes a resistor R5, which is connected between an output node of the voltage divider R3 and R4 and the FB pin of the first slave converter 5-221, and a capacitor C1 connected between the FB pin of the first slave converter 5-221 and the ground terminal. A time constant (C1//R5(R3//R4)) of the first power distribution balancing circuit 5-430 is determined by considering a normal switching frequency range of the master converter 5-211.

Similar to the first power distribution balancing circuit 5-430, the second power distribution balancing circuit 550 includes a voltage divider and a low pass filter that are coupled to each other. The voltage divider includes resistors R6 and R7 serially connected to each other between the SW pin of the first slave converter 5-221 and the ground terminal. The low pass filter includes a resistor R8, which is connected between an output node of the voltage divider R6 and R7 and the FB pin of the second slave converter 541, and a capacitor C2 connected between the FB pin of the second slave converter 541 and the ground terminal. A time constant (C2//R8(R6//R7)) of the second power distribution balancing circuit 550 is determined by considering a normal switching frequency range of the first slave converter 5-221.

Figure 6:
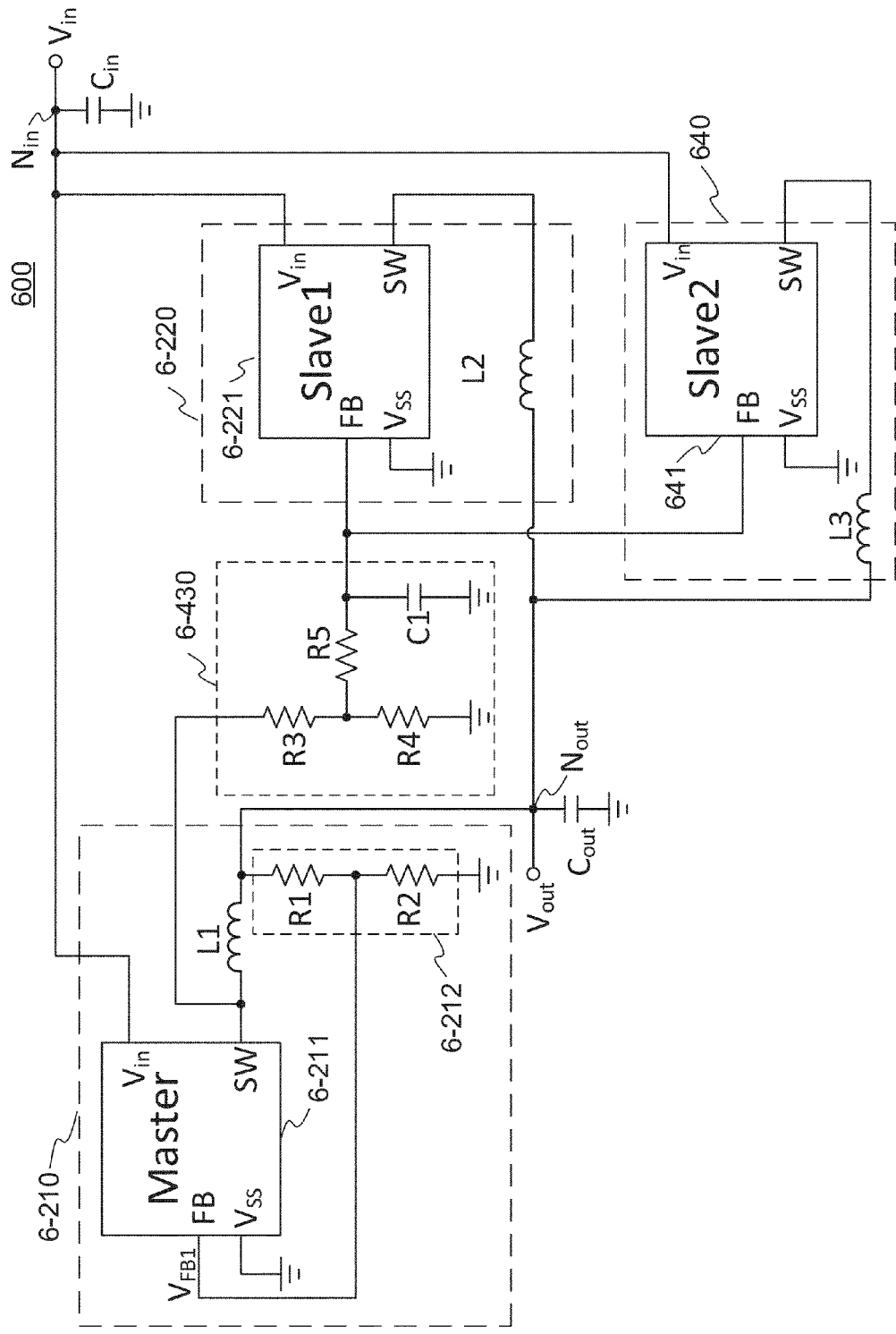
FIG. 6 illustrates a multi-converter system according to an embodiment.

FIG. 6 illustrates a multi-converter system 600 according to yet another embodiment of the present disclosure. The multi-converter system 600 works as a triple converter system using parallel triggering. The multi-converter system 600 is configured to provide a rapid response for a heavy transient load toggling application.

The multi-converter system 600 includes first to third converter stages 6-210, 6-220, and 640 and a power distribution balancing circuit 6-430. The first to third converter stages 6-210, 6-220, and 640 are coupled to and disposed between an input voltage node Nin and an output voltage node Nout. The power distribution balancing circuit 6-430 is coupled to and disposed between the first converter stage 6-210 and the second and third converter stages 6-220, and 640.

The first converter stage 6-210 has substantially the same configuration as that of the first converter stage 210 shown in FIG. 2. That is, the first converter stage 6-210 includes a master converter 6-211, a feedback module 6-212, and an inductor L1.

Each of the second and third converter stages 6-220 and 640 has substantially the same configuration as that of the second converter stage 4-220 shown in FIG. 4. In an embodiment, the second converter stage 6-220 includes a first slave converter 6-221 and an inductor L2. The third converter stage 640 includes a second slave converter 641 and an inductor L3. In another embodiment, the inductor L3 has a different inductance from that of the inductor L2.

The power distribution balancing circuit 6-430 is coupled to and disposed between an SW pin of the master converter 6-211 and FB pins of the first and second slave converters 6-221 and 641. The power distribution balancing circuit 6-430 detects a frequency of a PWM switching signal of the master converter 6-211 and triggers the first and second slave converters 6-221 and 641 to work at the same time.

Therefore, as a load driven by the multi-converter system 600 increases, the master converter 6-211 may enable the first and second slave converters 6-221 and 641 at the same time to convert the input voltage Vin into the output voltage Vout according to load variation with high power efficiency.

The power distribution balancing circuits 6-430 has substantially the same configuration as that of the power distribution balancing circuit 430 shown in FIG. 4, but embodiments are not limited thereto.

In an embodiment, the power distribution balancing circuit 6-430 includes a voltage divider and a low pass filter, which are coupled to each other. The voltage divider includes resistors R3 and R4 serially connected to each other between the SW pin of the master converter 6-211 and a ground terminal. The low pass filter includes a resistor R5, which is connected between an output node of the voltage divider R3 and R4 and the FB pins of the first and second slave converters 6-221 and 641, and a capacitor C1 connected between the FB pins of the first and second slave converters 6-221 and 641 and the ground terminal. A time constant (C1//R5(R3//R4)) of the power distribution balancing circuit 6-430 is determined by considering a normal switching frequency range of the master converter 6-211.

Figure 7:
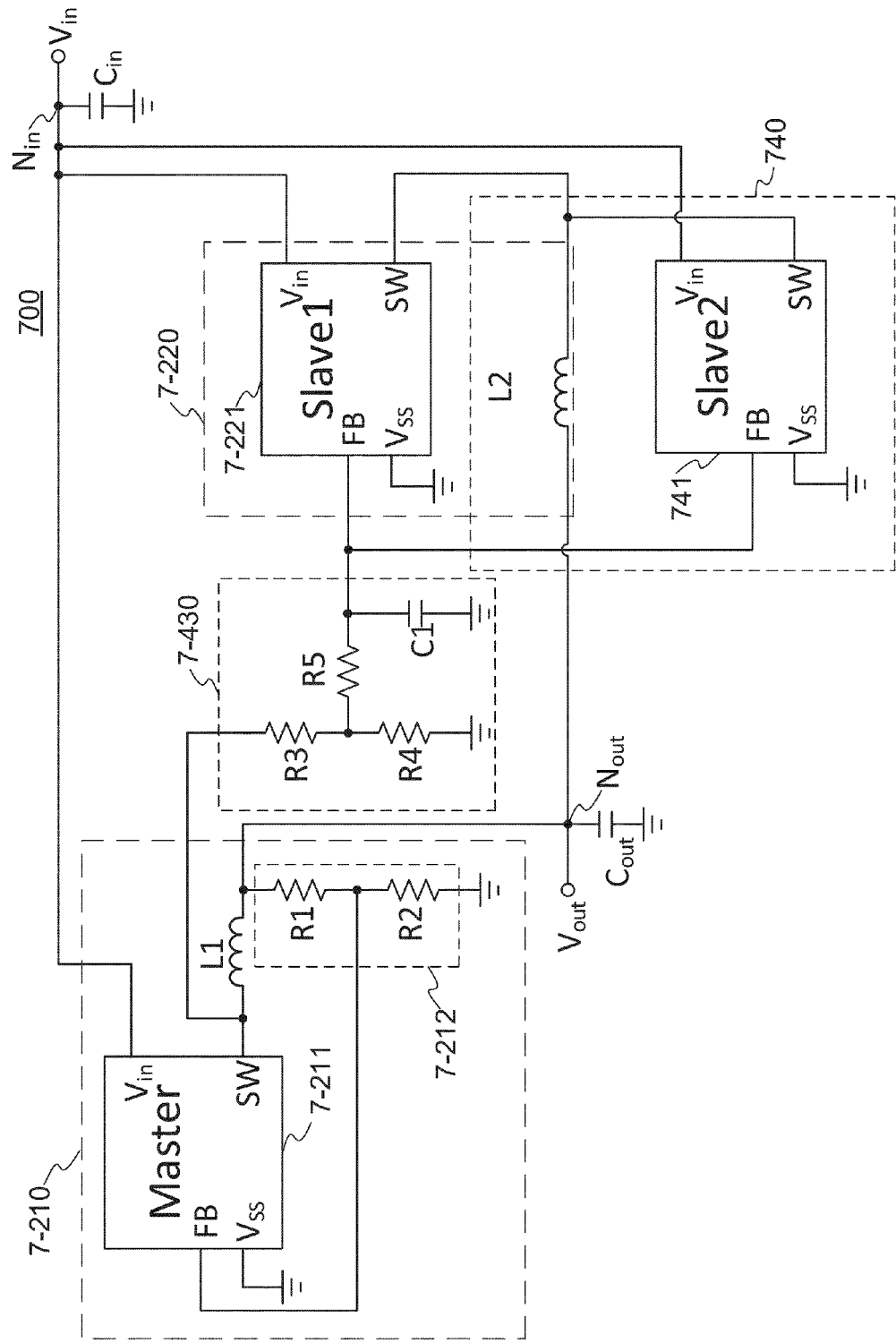
FIG. 7 illustrates a multi-converter system according to an embodiment.

FIG. 7 illustrates a multi-converter system 700 according to yet another embodiment of the present disclosure. The multi-converter system 700 works as a triple converter system using parallel triggering. The multi-converter system 700 provides rapid response for heavy transient load toggling application.

The multi-converter system 700 includes first to third converter stages 7-210, 7-220, and 740, which are coupled to and disposed between an input voltage node Nin and an output voltage node Nout, and a power distribution balancing circuit 7-430 coupled to and disposed between the first converter stage 7-210 and the second and third converter stages 7-220 and 740.

In the multi-converter system 700, the second and third converter stages 7-220 and 740 share an inductor L2 unlike the second and third converter stages 6-220 and 640 of the multi-converter system 600. The remaining components of the multi-converter system 700 are substantially the same as those of the multi-converter system 600, and thus detailed description thereof will be omitted for illustrative convenience.

Figure 8:
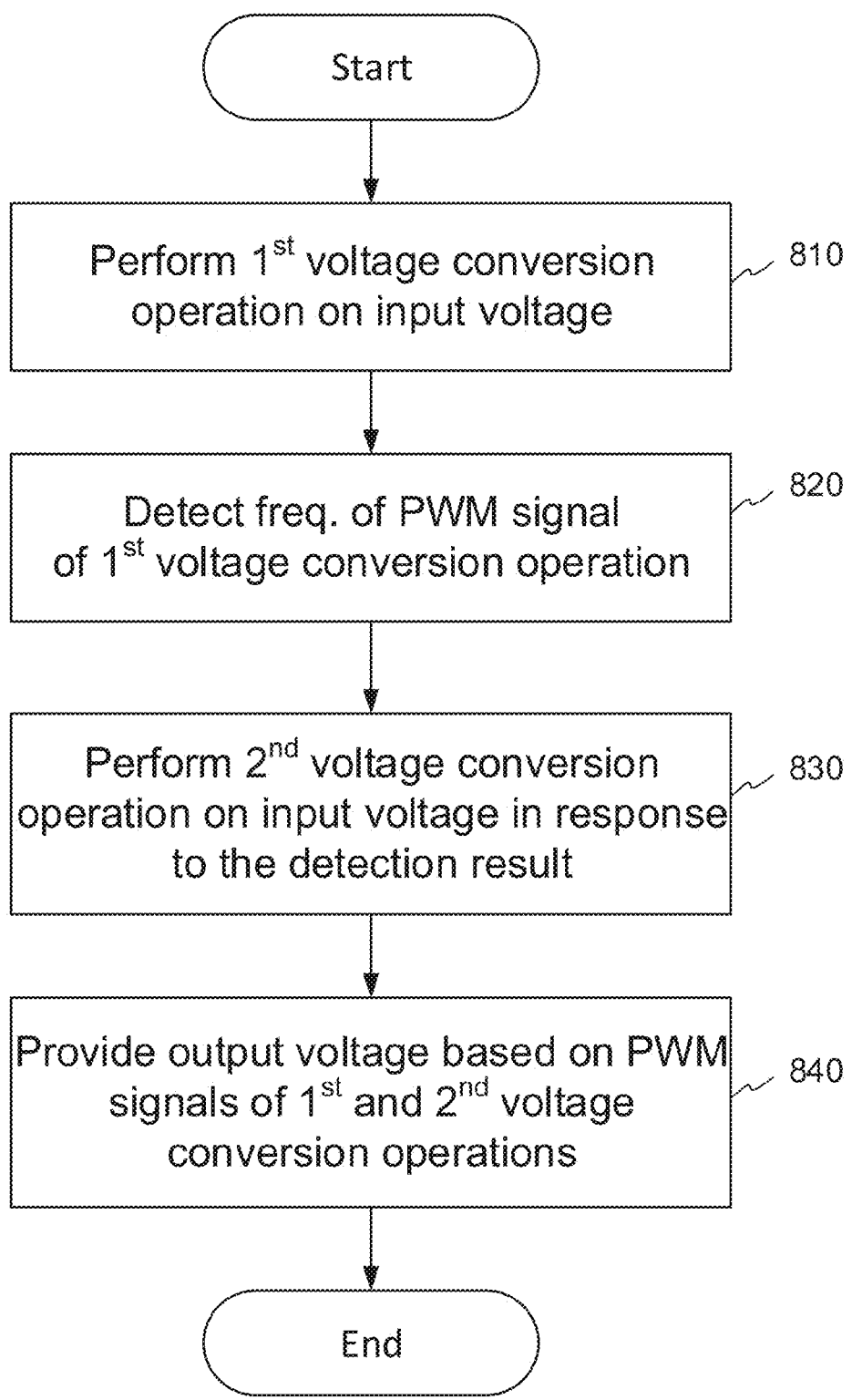
FIG. 8 is a flow chart showing an operating method of a multi-converter system according to an embodiment.

FIG. 8 is a flow chart showing an operating method of a multi-converter system according to an embodiment of the present disclosure. The method is described with reference to FIG. 4.

At 810, the master converter 4-211 performs a first voltage conversion operation on an input voltage Vin. At 820, the power distribution balancing circuit 430 detects a frequency of a PWM switching signal of the master converter 4-211 and outputs a control signal to the slave converter 4-221. At 830, the slave converter 4-221 performs a second voltage conversion operation on the input voltage Vin in response to the control signal. At 840, an output voltage Vout is provided based on the PWM switching signal of the master converter 4-211 and a PWM switching signal of the slave converter 4-221.

By performing the above procedure, the slave converter 4-221 outputs the PWM switching signal having a frequency that follows the frequency of the PWM switching signal of the master converter 4-211. In an embodiment, the frequency of the PWM switching signal of the slave converter 4-221 is corresponds to (e.g., substantially the same as) the frequency of the PWM switching signal of the master converter 4-211. As a result, the output power Vout may be taken evenly from the master converter 4-211 and the slave converter 4-221, which may result in improved high power efficiency.

Figure 9:
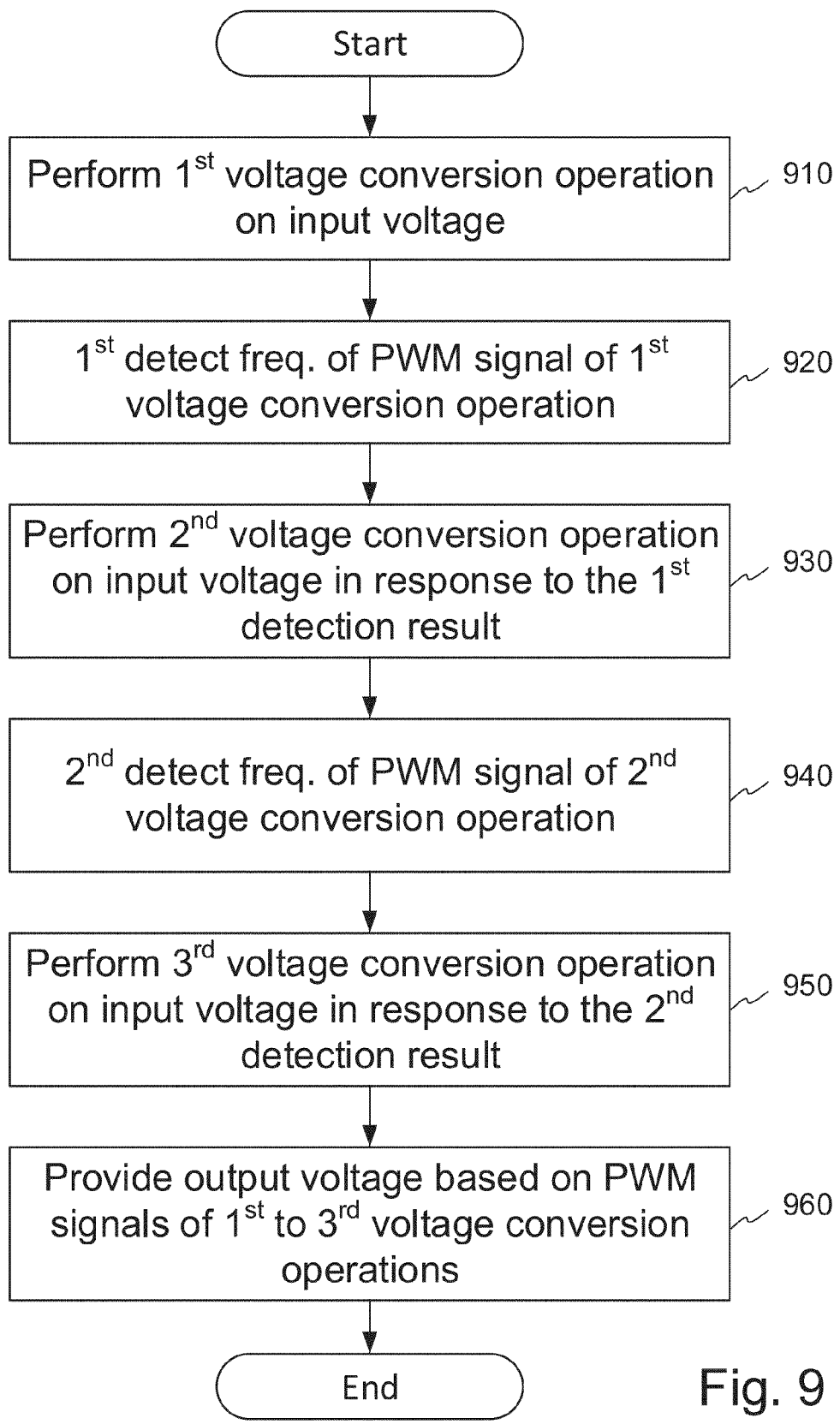
FIG. 9 is a flow chart showing an operating method of a multi-converter system according to an embodiment.

FIG. 9 is a flow chart showing an operating method of a multi-converter system according to another embodiment of the present disclosure. The method is described with reference to FIG. 5.

At 910, the master converter 5-211 performs a first voltage conversion operation on an input voltage Vin. At 920, the first power distribution balancing circuit 5-430 detects a frequency of a PWM switching signal of the master converter 5-211 and outputs a first control signal to the first slave converter 5-221. At 930, the first slave converter 5-221 performs a second voltage conversion operation on the input voltage Vin in response to the first control signal. At 940, the second power distribution balancing circuit 550 detects a frequency of a PWM switching signal of the first slave converter 5-221 and outputs a second control signal to the second slave converter 541. At 950, the second slave converter 541 performs a third voltage conversion operation on the input voltage Vin in response to the second control signal. At 960, an output voltage Vout induced by the PWM switching signals of the master converter 5-211, the first slave converter 5-221, and the second slave converter 541 is provided.

By performing the above procedure, the first to third converter stages 5-210, 5-220, and 540 sequentially drive a load coupled to an output voltage node Nout. As a result, the output power Vout may be taken evenly from the master converter 5-211 and the first and second slave converters 5-221 and 541, which may result in improved high power efficiency.

Figure 10:
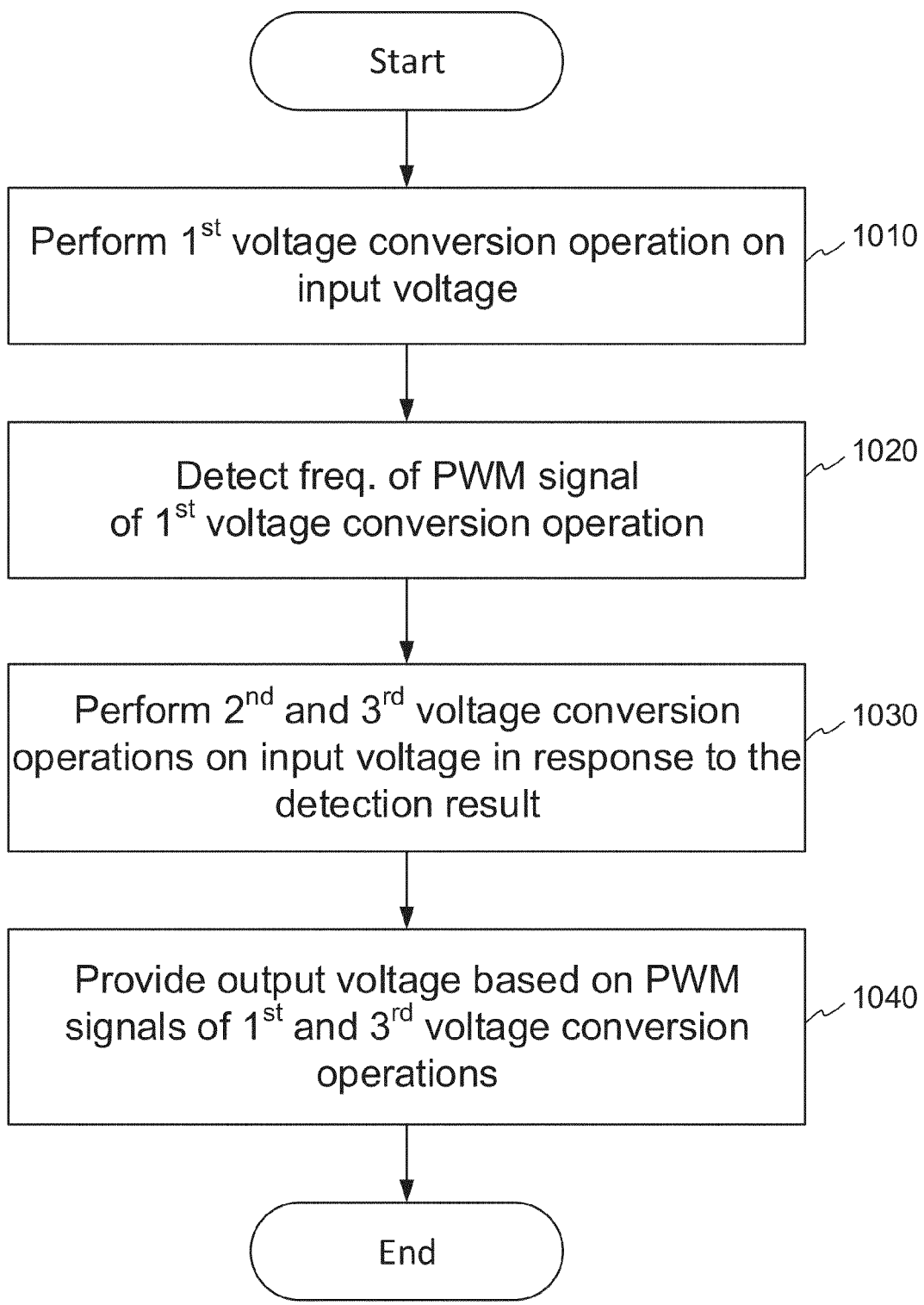
FIG. 10 is a flow chart showing an operating method of a multi-converter system according to an embodiment.

FIG. 10 is a flow chart showing an operating method of a multi-converter system according to yet another embodiment of the present disclosure. The method is described with reference to FIG. 6.

At 1010, the master converter 6-211 performs a first voltage conversion operation on an input voltage Vin. At 1020, the power distribution balancing circuit 6-430 detects a frequency of a PWM switching signal of the master converter 6-211 and outputs a control signal to the first and second slave converters 6-221 and 641. At 1030, the first and second slave converters 6-221 and 641 simultaneously perform second and third voltage conversion operations, respectively, on the input voltage Vin in response to the control signal. At 1040, an output voltage Vout induced by the PWM switching signal of the master converter 6-211 and PWM switching signals of the first and second slave converters 6-221 and 641 is provided.

At 1040, an output voltage Vout induced by the PWM switching signal of the master converter 6-211 and PWM switching signals of the first and second slave converters 6-221 and 641 is provided.

By performing the above procedure, the first to third converter stages 6-210, 6-220, and 640 may drive a load coupled to an output voltage node Nout with a rapid response for a heavy transient load toggling application.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A multi-converter system, comprising:
a first converter configured to receive an input voltage and output a first pulse width modulation (PWM) switching signal based on the input voltage;
a power distribution balancing circuit configured to detect a frequency of the first PWM switching signal and generate a control signal based on the frequency of the first PWM switching signal;
a second converter configured to receive the input voltage and output a second PWM switching signal in response to the control signal; and
an output voltage node configured to output an output voltage based on the first and second PWM switching signals,
wherein the power distribution balancing circuit comprises:
a low pass filter disposed between an output node of the first converter and a ground terminal to receive the first PWM switching signal; and
a bridging element disposed between an output node of the low pass filter and a feedback node of the second converter to provide the control signal to the feedback node of the second converter.

2. The multi-converter system of claim 1, wherein the second converter is controlled to output the second PWM switching signal having a frequency corresponding to that of the first PWM switching signal to balance power distribution between the first converter and the second converter.

3. The multi-converter system of claim 1, wherein the control signal is used to determine a DC operating point of a voltage input to the feedback node of the second converter.

4. The multi-converter system of claim 1, further comprising:
a feedback module configured to generate a feedback voltage based on the output voltage and provide the feedback voltage to a feedback node of the first converter.

5. The multi-converter system of claim 4, wherein the feedback module is a first feedback module, and
wherein the multi-converter system further comprises a second feedback module configured to generate a feedback voltage based on the output voltage and provide the feedback voltage of the second feedback module to the feedback node of the second converter.

6. The multi-converter system of claim 5, wherein the second converter receives through the feedback node a voltage determined based on the control signal and the feedback voltage output from the second feedback module.

7. The multi-converter system of claim 1, wherein the low pass filter comprises:
   a first resistor disposed between the output node of the first converter and the output node of the low pass filter;
   a second resistor disposed between the output node of the low pass filter and the ground terminal; and
   a capacitor disposed between the output node of the low pass filter and the ground terminal.

8. The multi-converter system of claim 7, wherein a time constant of the second feedback module and the power distribution balancing circuit is determined by considering a normal switching frequency range of the first converter.

9. A multi-converter system, comprising:
   a first converter configured to receive an input voltage and output a first pulse width modulation (PWM) switching signal based on the input voltage;
   a power distribution balancing circuit configured to detect a frequency of the first PWM switching signal and generate a control signal based on the frequency of the first PWM switching signal;
   a second converter configured to receive the input voltage and output a second PWM switching signal in response to the control signal; and
   an output voltage node configured to output an output voltage based on the first and second PWM switching signals,
   wherein the power distribution balancing circuit comprises:
      a voltage divider disposed between an output node of the first converter and a ground terminal to receive the first PWM switching signal; and
      a low pass filter disposed between an output node of the voltage divider and a feedback node of the second converter to provide the control signal to the feedback node of the second converter.

10. The multi-converter system of claim 9, wherein the low pass filter comprises:
   a resistor disposed between the output node of the voltage divider and the feedback node of the second converter; and
   a capacitor disposed between the feedback node of the second converter and the ground terminal,
   wherein a time constant of the power distribution balancing circuit is determined by considering a normal switching frequency range of the first converter.

11. The multi-converter system of claim 9, wherein the power distribution balancing circuit is a first power distribution balancing circuit outputting a first control signal, the multi-converter system further comprising:
   a second power distribution balancing circuit configured to detect a frequency of the second PWM switching signal and output a second control signal based on the frequency of the second PWM switching signal; and
   a third converter configured to receive the input voltage and output a third PWM switching signal in response to the second control signal, and
   wherein the output voltage is provided based on the first, second, and third PWM switching signals.

12. The multi-converter system of claim 11, wherein the second power distribution balancing circuit comprises:
   a voltage divider disposed between an output node of the second converter and a ground terminal to receive the second PWM switching signal; and
   a low pass filter disposed between an output node of the voltage divider and a feedback node of the third converter to provide the second control signal to the feedback node of the third converter.

13. The multi-converter system of claim 9, further comprising:
   a third converter configured to receive the input voltage and output a third PWM switching signal in response to the control signal,
   wherein the output voltage of the multi-converter system is determined based on the first, second, and third PWM switching signals.

14. The multi-converter system of claim 13, further comprising:
   a first inductor disposed between an output node of the first converter and the output voltage node, and
   a second inductor disposed between output nodes of the second and third converters and the output voltage node.

15. A method comprising:
   providing a first PWM switching signal based on an input voltage by a first converter;
   generating a control signal based on a frequency of the first PWM switching signal by a power distribution balancing circuit;
   providing a second PWM switching signal based on the input voltage and the control signal by a second converter; and
   outputting an output voltage based on the first and second PWM switching signals,
   wherein the power distribution balancing circuit comprises:
      a voltage divider disposed between an output node of the first converter and a ground terminal to receive the first PWM switching signal; and
      a low pass filter disposed between an output node of the voltage divider and a feedback node of the second converter to provide the control signal to the feedback node of the second converter.

16. The method of claim 15, wherein the power distribution balancing circuit is a first power distribution balancing circuit and the control signal is a first control signal, the method further comprising:
   generating a second control signal based on the frequency of the second PWM switching signal by a second power distribution balancing circuit; and
   providing a third PWM switching signal based on the input voltage and the second control signal by a third converter, and
   wherein the output voltage is determined based on the first, second, and third PWM switching signals.

17. The method of claim 15, further comprising:
   providing a third PWM switching signal based on the input voltage and the control signal by a third converter,
   wherein the output voltage is determined based on the first, second, and third PWM switching signals.

18. The method of claim 15, wherein the second PWM switching signal has a frequency corresponding to that of the first PWM switching signal to balance power distribution between the first converter and the second converter.

19. The method of claim 15, wherein the control signal is used to determine a DC operating point of a voltage input to a feedback node of the second converter.

20. A method comprising:
   providing a first PWM switching signal based on an input voltage by a first converter;
   generating a control signal based on a frequency of the first PWM switching signal by a power distribution balancing circuit;
   providing a second PWM switching signal based on the input voltage and the control signal by a second converter; and outputting an output voltage based on the first and second PWM switching signals, wherein the power distribution balancing circuit comprises:
- a low pass filter receiving the first PWM switching signal between an output node of the first converter and a ground terminal; and
- a bridging element providing the control signal to a feedback node of the second converter between an output node of the low pass filter and the feedback node of the second converter.

* * * * *